United States Patent [19]

Rinkewich

[11] Patent Number: 4,558,719

[45] Date of Patent: Dec. 17, 1985

[54] CYCLICALLY-OPERABLE VALVE PARTICULARLY FOR IRRIGATION

[76] Inventor: Isaac Rinkewich, 12 Fishman Maimon St., Tel-Aviv, Israel

[21] Appl. No.: 594,875

[22] Filed: Mar. 29, 1984

[30] Foreign Application Priority Data

Nov. 25, 1983 [IL] Israel .................................. 70328

[51] Int. Cl.[4] .......................................... F16K 31/48
[52] U.S. Cl. .............................. 137/624.14; 251/54; 251/55
[58] Field of Search ................... 137/624.14; 188/320; 251/51, 54, 55

[56] References Cited

U.S. PATENT DOCUMENTS

| 849,105 | 4/1907 | Brooks | 137/624.14 |
| 1,218,567 | 3/1917 | Kellan | 137/624.14 |
| 3,042,074 | 7/1962 | Gragbell | 137/624.14 X |
| 4,118,005 | 10/1978 | O'Neil | 137/624.14 X |

FOREIGN PATENT DOCUMENTS

| 1068219 | 6/1954 | France | 188/320 |
| 484737 | 9/1953 | Italy | 188/320 |

*Primary Examiner*—Alan Cohan
*Attorney, Agent, or Firm*—Benjamin J. Barish

[57] ABSTRACT

A cyclically-operable valve comprises a timer including a reciprocatable member driven by the pressurized fluid through forward strokes, return means for driving the member through return strokes, and a dashpot device coupled to the member and retarding its movement through one of said strokes.

7 Claims, 10 Drawing Figures

CYCLICALLY-OPERABLE VALVE PARTICULARLY FOR IRRIGATION

RELATED APPLICATIONS

The present application is related to my copending application Ser. No. 429,672 filed Sept. 30, 1982 now abandoned.

BACKGROUND OF THE INVENTION

The present invention relates to cyclically-operable valves. The invention is particularly applicable to cyclically-operable valves for controlling water distribution devices, such as water sprinklers, in accordance with the system described in my prior application Ser. No. 429,672, and is therefore described below with respect to such application.

My prior application Ser. No. 429,672 describes a water distribution system, e.g., for supplying water to sprinklers or other irrigating devices, including a plurality of cyclically-operable valves all randomly operated in an intermittent manner for a small portion of each cycle, e.g. from one-fifth to one-fiftieth of the complete cycle. Thus, by this random intermittent operation of each irrigating device, the overall load requirements for the system are substantially reduced, thereby enabling the system to utilize smaller-sized pipes, lowercapacity pumps, and the like. At the same time, this intermittent random operation permits water at relatively high pressure to be supplied at short intervals, and therefore provides, among other advantages, larger area coverage than if the same total quantity of water were applied continuously, such as in a conventional dripirrigation system.

SUMMARY OF THE INVENTION

An object of the present invention is to provide a cyclically-operable valve of simple and inexpensive construction particularly useful in such a water distribution system.

According to a broad aspect of the present invention, there is provided a cyclically-operable valve including an inlet connectable to a pressurized fluid supply line, an outlet, a valve member controlling the flow of the fluid from the inlet to the outlet, and a cyclically-operable timer driven by the energy of the pressurized fluid and coupled to the valve member for cyclically opening and closing same. The cyclically-operable valve further comprises a reciprocatable piston fixed to one end of a stem and driven by the pressurized fluid through forward strokes; return means for driving the piston and stem through return strokes; and a fluid dash pot device fixed to the opposite end of the piston and controlling its movements during both the forward strokes and the return strokes of the piston.

More particularly, the dashpot device is effective: (a) during the portion of each cycle when the valve member is open, to permit the pressurized fluid to drive the piston through a fast forward stroke to close the valve, and (b) during the portion of each cycle when the valve member is closed, to permit the return means to drive the piston through a slow return stroke to open the valve.

Two embodiments of the invention are described below, in both of which the dashpot device comprises a plunger reciprocatable in a fluid-filled cylinder and dividing same into two chambers; the plunger including a high-flow-rate path having a one-way valve permitting the fluid to flow therethrough at a high rate when the plunger is reciprocated by the pressurized fluid from its valve-open position to its valve-closed position; the plunger further including a low-flow-rate path permitting the fluid to flow therethrough at a low rate when the plunger is reciprocated by the return means from its valve-closed position to its valve-open position.

Further features and advantages of the invention will be apparent from the description below.

BRIEF DESCRIPTION OF THE DRAWINGS

The invention is herein described, by way of example, with reference to the accompanying drawings, wherein:

FIGS. 4–6 are enlarged, fragmentary, sectional views of portions of the valve illustrated in FIGS. 1 and 2;

FIG. 7 is a fragmentary end elevational view of the portion of the valve illustrated in FIG. 5;

DESCRIPTION OF PREFERRED EMBODIMENTS

Figure 1:
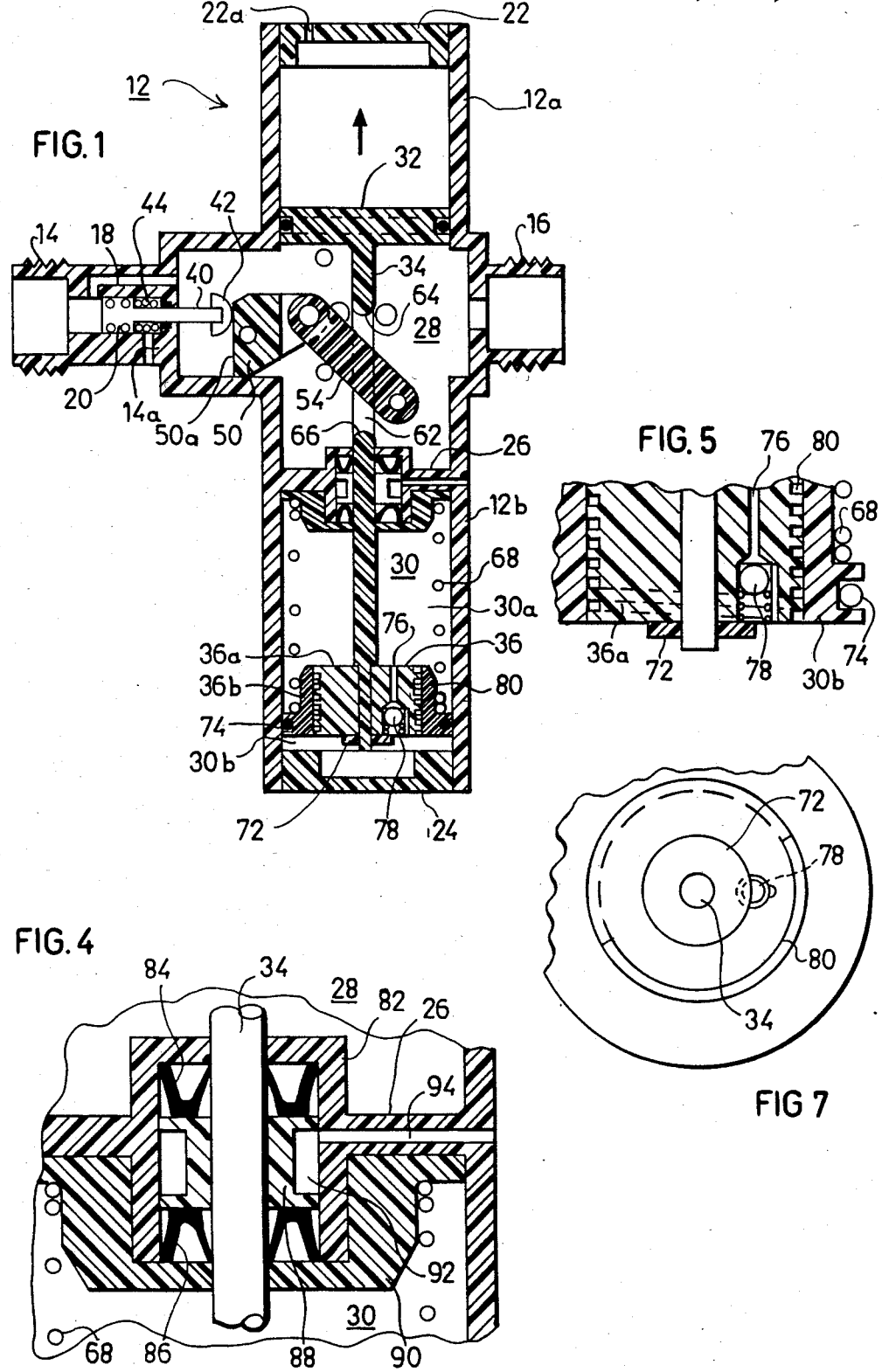
FIG. 1 is a longitudinal sectional view illustrating one form of cyclically-operable valve constructed in accordance with the present invention, the parts being shown in the valve-open position.
Figure 2:
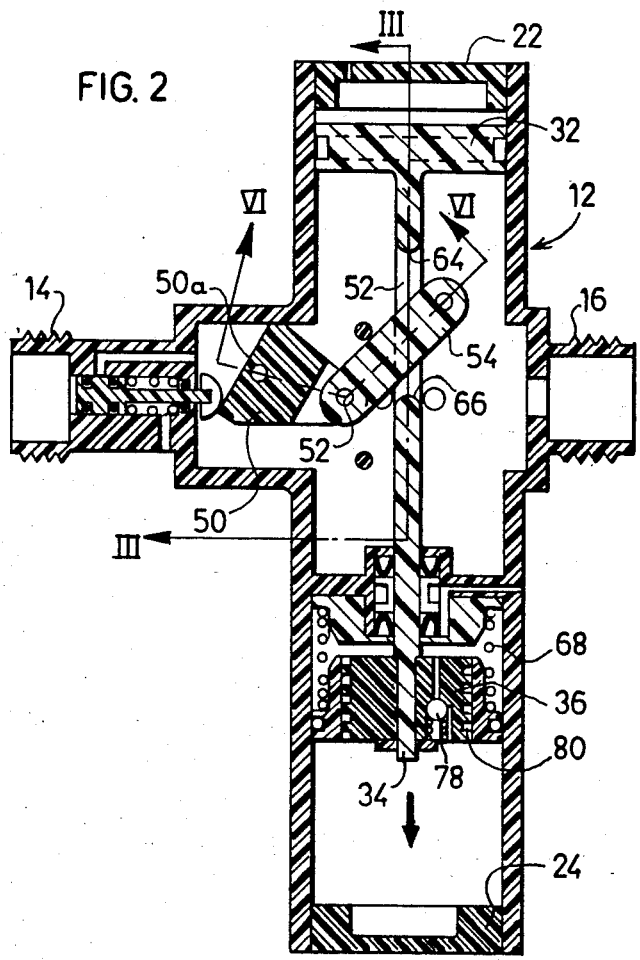
FIG. 2 is a view similar to that of FIG. 1, but with the parts shown in the valve-closed position.

The cyclically-operable valve illustrated in FIGS. 1 and 2 is particularly useful for controlling the flow of water to a water distribution device, such as a water sprinkler, so that the sprinkler will be supplied with water in a cyclical manner for but a minor portion of each cycle. Thus, the cycles may be from 1–60 minutes each, with the valve open for a period of one-fifth to one-fiftieth of each cycle and closed for the remaining major portion of each cycle. As described earlier, when a plurality of such cyclically-operable valves are included in a water distribution system, all randomly operating in an intermittent manner for a small portion of each cycle, the overall load requirements of the system are substantially reduced while at the same time the system permits each irrigation device to receive water at relatively high pressure.

The cyclically-operable valve illustrated in FIGS. 1 and 2 comprises a cylindrical housing 12 including an inlet 14 connectable to the pressurized water supply line, and an outlet 16 connectable to the water distribution device, such as a sprinkler, to be controlled by the valve. Housing 12 is further formed with a passageway 18 controlled by a valve member 20 such that when the valve member is in its open position (FIG. 1), communication is established between inlet 14 and outlet 16, but when the valve member is moved to its closed position (FIG. 2) such communication is interrupted.

Housing 12 includes end walls 22, 24, at opposite ends, which end walls are removable to provide access into the interior of the housing. The housing further includes a fixed partition wall 26 dividing the housing into two sections 12a, 12b, defining two compartments, 28 and 30.

Disposed within the upper end of compartment 28 is a displaceable member in the form of a piston 32 having a stem 34 passing through an aperture in partition wall 26 and carrying a plunger 36 movable in compartment 30. plunger 36 thus divides compartment 30 into two chambers: 30a, 30b.

Compartment 28, communicating with the valve inlet 14 and outlet 16, fills with water below piston 32, the portion of the compartment above piston 32 being vented to the atmosphere via bore 22a formed through end wall 22. Compartment 30, however, through which plunger 36 moves, forms a dashpot with the plunger and is filled with oil or other liquid of high viscosity.

Valve member 20 includes a stem 40 extending rearwardly into compartment 28 and terminating in an enlarged tip 42. The valve member is biased outwardly of compartment 28 by a light coil spring 44 interposed between the valve member and wall 14a through which the valve stem 40 passes. The water pressure applied to inlet 14 moves the valve member 20 inwardly of the housing until tip 42 of its stem 40 limits against a stop member 50 disposed within compartment 28. Stop member 50 is movable either to the valve-open position illustrated in FIG. 1, or to the valve-closed position illustrated in FIG. 2. In the valve-open position (FIG. 1),it permits the valve member to be moved by the inlet water pressure a greater distance inwardly into compartment 28 so as to clear the inlet of passageway 18; whereas in the valve-closed position (FIG. 2), stop member 50 limits the inward movement of the valve member such that it does not clear the inlet to passageway 18.

Figure 6:
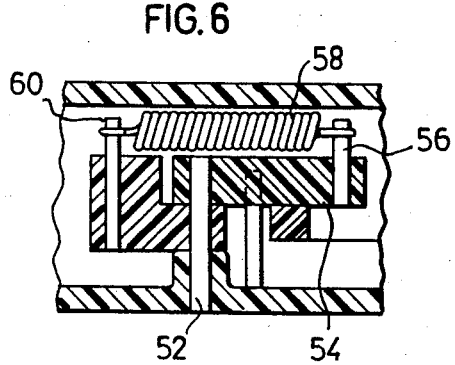

Stop member 50 is moved to its two positions by a snap-action toggle mechanism actuated by piston stem 34. Thus, as shown particularly in FIG. 6, the stop member is pivotably mounted to housing 12 by a pin 52, which pin also pivotably mounts one end of a toggle link 54; the opposite end of the latter link carries a second pin 56. An over-center spring 58 is mounted between pins 56 and a further pin 60, carried by the stop member, 50.

Toggle link 54 is received within a recess 62 (FIG. 3) formed in an intermediate portion of piston stem 34. The arrangement is such that when piston 32 moves from its upper position (FIGS. 2 and 3) to its lower position (FIG. 1), a shoulder 64 defining the upper edge of recess 62 engages toggle link 54 to pivot same from the FIG. 2 position to the FIG. 1 position; and when piston 32 moves from its lowermost position to its upper-position, another shoulder 66 defining the lower edge of recess 62 engages toggle link 54 to pivot it from its FIG. 1 position to its FIG. 2 position. In both cases, toggle link 54 and stop member 50 are moved with a snapaction at the end of the respective stroke of the piston stem because of the over-center spring 58 connecting these two members.

Stop member 50 is of generally triangular shape and is pivotably mounted at its inner apex by pin 52; this pin is located in alignment with the longitudinal axis of valve stem 40. Edge 50a of stop member 50 is engaged by the tip 42 of valve stem 40, and is substantially perpendicular to the longitudinal axis of valve stem 40 in the FIG. 1 position of the stop member, which is the position assumed by it when piston 32 is in its lowermost position. In this position of the stop member, tip 42 of the valve stem 40 engages a point at the upper side of edge 50a. This engaged point is a relatively short distance from the pivotal mounting pin 52. Thus, the valve member 20 may be moved by the water pressure a greater distance into the housing 12, sufficient to clear the inlet of passageway 18, thereby establishing communication between housing inlet 14 and housing outlet 16.

However, when stop member 50 is pivoted to the FIG. 2 position by toggle link 54, edge 50a of the stop member 50 pivots clockwise so that tip 42 of valve stem 40 now engages a point at the lower end of this edge, which point is a greater distance from the pivotal mounting pin 52 of the stop member, as shown in FIG. 2. In this position of the stop member, the valve member 20 is permitted to move by the inlet pressure a short distance into housing 12, sufficient to enable the valve member to cover the inlet to passageway 18, thereby terminating the flow of water from the housing inlet 14 to the housing outlet 16.

It will be appreciated that when the passageway is opened by valve member 20 (FIG. 1), the inlet pressure is also applied to the underface of piston 32. This pressure causes the piston to rise within the upper cylindrical portion of housing section 12a since the space above the piston is vented to the atmosphere via bore 22a. Thus, when valve member 20 is in the open condition with respect to passageway 18, piston 32 is driven through one stroke, called the forward stroke, by the water pressure applied at inlet 14.

A coil spring 68 is located between dashpot plunger 36 and partition wall 26, which coil spring is loaded during the forward stroke of piston 32. At the end of the forward stroke, valve member 20 is moved to the valve-closed position illustrated in FIG. 2 (by stop member 50 and toggle link 54 as described above), whereupon spring 68, loaded during the forward stroke, now drives the piston through its return stroke.

The dashpot plunger 36, carried at the lower end of piston stem 34, is constructed so as to permit relatively rapid forward-stroke movements of the piston 32, but to substantially retard the return-stroke movements of the piston. For this purpose, plunger 36 is constituted of a central core 36a and an annular sleeve 36b frictionally enclosing the core. The core 36a is secured to the bottom of piston stem 34 by a retainer clip 72; and the outer face of sleeve 36b carries a sealing ring 74 for sealing the plunger with respect to the inner face of the dashpot housing section 12b. Core 36a of the plunger has a high-flow-rate passageway 76 therethrough controlled by a one-way ball valve 78. The outer face of core 36a is formed with a spiral groove 80 defining a long, spiral, low-flow-rate passageway between the outer face of core 36a and the inner face of sleeve 36b.

In order to enhance the seal between the oil-sealed dashpot compartment 30, and the water-filled compartment 28 on the upper side of partition wall 26, in view of the passage of piston stem 34 through this wall, the central portion of wall 26 through which piston stem 34 passes preferably is constructed as seen in FIG. 4. Thus, this central portion of partition wall 26 is formed with a cylindrical socket 82 closed at the end facing water compartment 28 and open at the opposite end facing the oil compartment 30. Within this socket is received two sealing rings 84, 86, on opposite sides of a pressure ring 88. A further ring 90 is disposed within compartment 30 and is engaged by the upper end of coil spring 68 within that compartment, the lower end of the coil spring being engaged by plunger 36 as described earlier. Ring 88 is of substantially the same outer diameter as the inner diameter of cylindrical socket 82 formed in partition wall 26, but is formed with an annular groove 92 at an intermediate portion between the opposite ends to provide a space between the two sealing rings 84 and 86. The space defined by groove 92 is shunted to the atmosphere by means of a bore 94 extending through partition wall 26.

The valve illustrated in FIGS. 1–7 of the drawings operates as follows:

First, it will be assumed the valve is in its open condition (FIG. 1), wherein piston 32 is in its lowermost position and valve member 20 is in its innermost position clearing the inlet to passageway 18 thereby permitting the water to flow from inlet 14 to outlet 16.

The inlet pressure applied to the lower face of piston 32 drives the piston upwardly through its forward stroke. This upward movement of the piston also causes the dashpot plunger 36 carried at the lower end of piston stem 34 also to move upwardly, thereby loading spring 68. This upward movement of the piston is fairly rapid because of the high-flow-rate passageway 76 through plunger 36.

Figure 3:
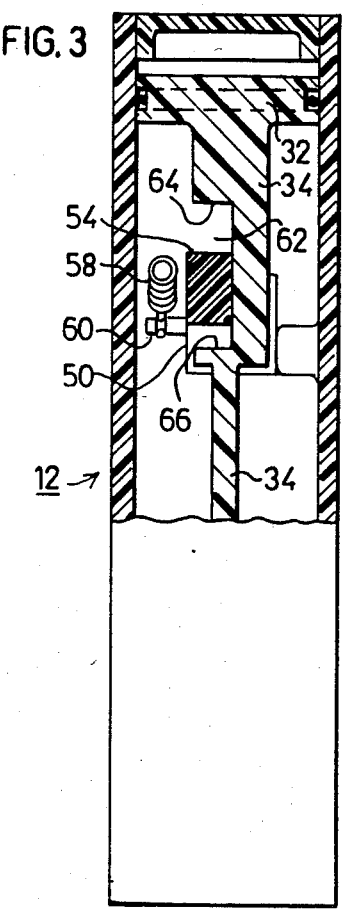
FIG. 3 is an end elevational view, partly in section along lines III—III of FIG. 2.

When piston 32 reaches its uppermost position illustrated in FIGS. 2 and 3, which defines the end of the forward stroke, its lower shoulder 66 engages toggle link 54 to actuate this link, and also stop member 50 pivotably mounted thereto, to the positions of these members illustrated in FIG. 2, this actuation of link 54 and stop member 50 being by a snap-action at the end of the forward stroke. When stop member 50 is thus actuated to the FIG. 2 position, it moves valve member 20 outwardly of the inlet 14 so that the valve member now closes the inlet to passageway 18, thereby interrupting the flow of water from inlet 14 to outlet 16. This also interrupts the pressure applied to the underface of piston 32. However, spring 68, previously loaded during the forward stroke of the piston, now presses against dashpot plunger 36 to move it downwardly, and thereby also to move piston 32 downwardly through its return stroke.

During this downward movement of plunger 36, ball valve 78 prevents the flow of the oil through the high-flow-rate passageway 76, so that the flow of the oil is restricted to the slow-flow-rate spiral passageway 80, thereby regarding the return movement of the plunger 36 and of the piston 32. When the piston 32 has returned to its lowermost position, as illustrated in FIG. 1, its stem 34 again actuates toggle link 54 to move stop member 50 to the FIG. 1 position, thereby reopening the valve inlet passageway 18.

It will thus be seen that because of the above-described regarding of plunger 36 during the return strokes of piston 32, the return strokes will take a considerably longer period of time than the forward strokes, so that the valve is in its closed condition (FIG. 2) for a much longer portion of each cycle than when it is in its open position (FIG. 1). As one example, each cycle may be 12-minutes, with the valve open for only two minutes thereof.

Figure 8:
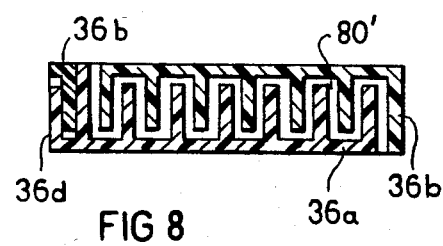
FIG. 8 illustrates a modification in the valve of FIGS. 1 and 2.

FIG. 8 illustrates a variation, wherein the slow-flow-rate passage formed between the outer face of plunger core 36a and its outer sleeve 36b, is of a labyrinth configuration as described above. This can be easily achieved by merely configuring the ribs formed in the outer face of plunger core 36a, 36b to interlock to form a labyrinth 80', rather than a spiral.

Figure 9:
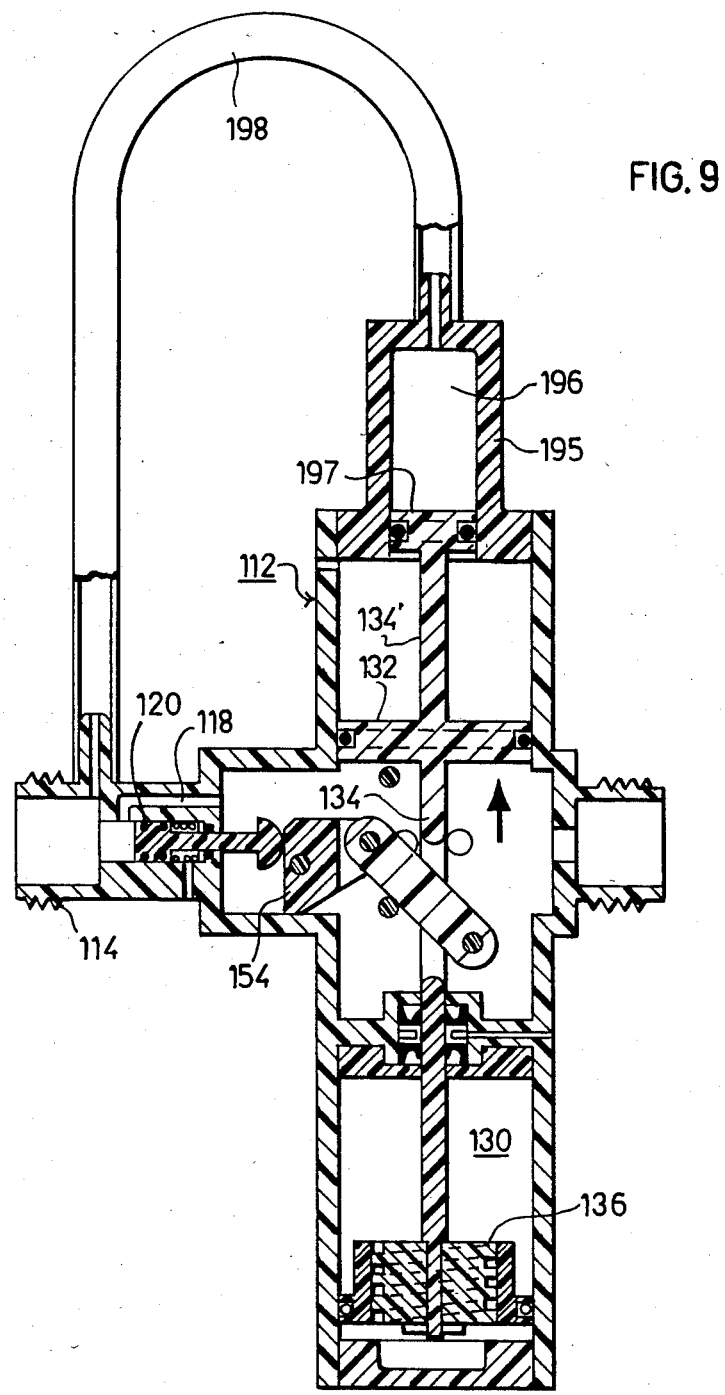
FIGS. 9 and 10 are longitudinal sectional views illustrating another cyclically-operable valve, constructed in accordance with the invention, FIG. 9 showing the parts in the valve-open position, and FIG. 10 showing the parts in the valve-closed position.
Figure 10:
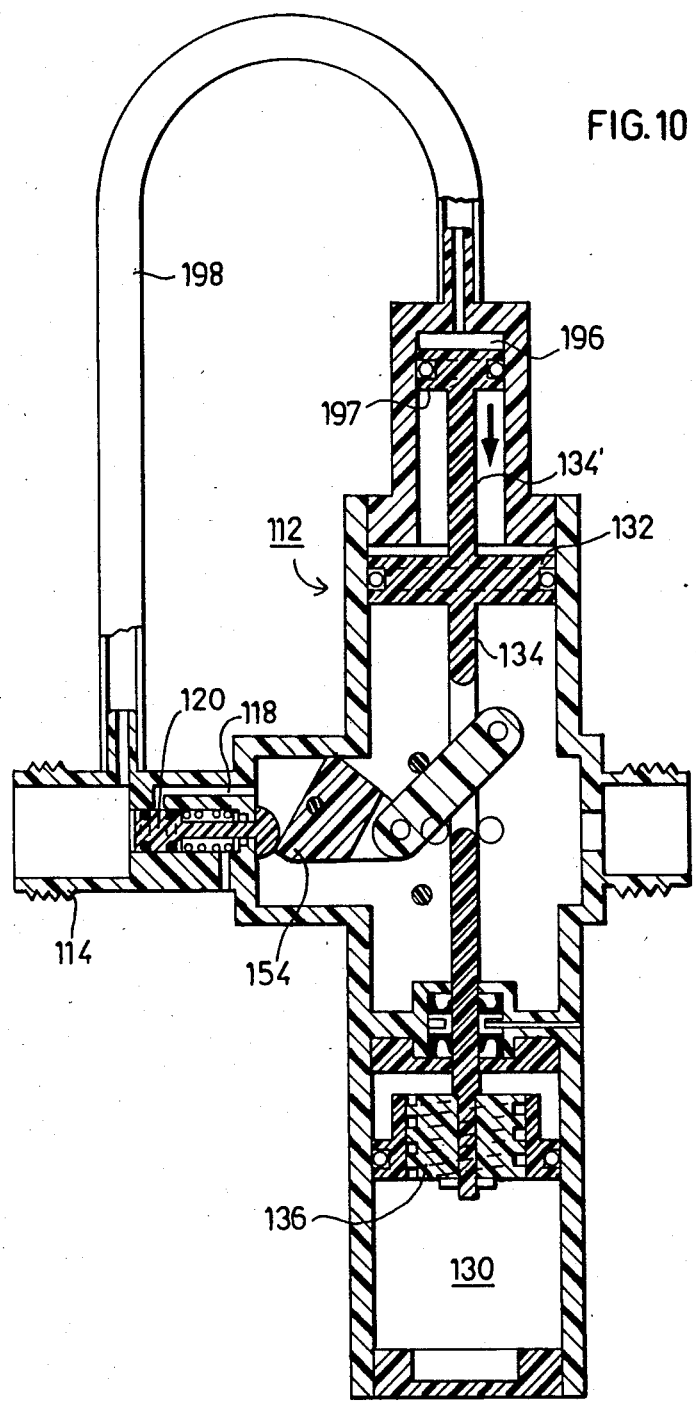

FIGS. 9 and 10 illustrate a still further variation, wherein the return movement of the dashpot plunger, therein designated 136, is also effected by the water pressure, rather than by the provision of a return spring. For this purpose, the upper end of housing 112 is closed by a cylinder 195 defining a further compartment 196 through which moves another piston 197 secured to an extension 134' of piston stem 134. Continuous communication is established between compartment 196 and the valve inlet 114 by means of a tube 198. That is to say, chamber 196 is always subjected to the inlet pressure, both in the open position of valve member 120 with respect to passageway 118 (FIG. 9), and the closed position of the valve member (FIG. 10). The cross-sectional area of the additional piston 197, however, is smaller than that of the main piston 132, so that the force produced by piston 197 is effective only during the return strokes.

Thus, during the forward strokes of piston 132, when the valve is in its open condition with respect to passageway 118 as shown in FIG. 9, the inlet pressure applied to the underface of piston 132 will produce a greater force, because of the greater cross-sectional area of this piston, than the counterforce produced by the inlet pressure applied to the upper face of piston 197. Accordingly, piston 132 will move upwardly through its forward stroke in the same manner as described above with respect to the embodiment of FIGS. 1–7. However, at the end of the forward stroke, when valve member 120 is moved by stop member 154 to its closed position with respect to passageway 118 (FIG. 10), the inlet pressure applied to piston 132 will terminate, so that the inlet pressure applied to piston 197 will now drive piston 197, and with it piston 132 and dashpot plunger 136, through its return stroke. This return stroke is retarded by the low-flow-rate spiral passageway 80 or labyrinth passageway 80' (FIG. 8) in the same manner as described above. In all other respects, the structure and operation of the valve illustrated in FIGS. 9 and 10 are the same as described above with respect to FIGS. 1–8.

The embodiment illustrated in FIGS. 9 and 10 could also include a high-flow-rate passageway and a one-way valve, corresponding to elements 76 and 78 in the FIGS. 1–8 embodiment. Many other variations will be apparent.

What is claimed is:

1. A cyclically-operable valve including an inlet connectable to a pressurized fluid supply line, an outlet, a valve member controlling the flow of the fluid form the inlet to the outlet, and a cyclically-operable timer driven by the energy of the pressurized fluid and coupled to said valve member for cyclically opening and closing same; said cyclically-operable timer comprising: a reciprocatable piston fixed to one end of a stem and driven by the pressurized fluid through forward strokes; return means for driving, said piston and stem through return strokes; a fluid dashpot device fixed to the opposite end of said stem and retarding its movement; and coupling means coupling an intermediate portion of said stem to said valve member for cyclically opening and closing same; said dashpot device being effective: (a) during the portion of each cycle when the valve member is open, to permit the pressurized fluid to drive the piston through a fast forward stroke to close the valve, and (b) during the portion of each cycle when the valve member is closed, to permit said return means to drive the piston through a slow return stroke to open the valve.

2. The valve according to claim 1, wherein said dashpot device comprises a plunger reciprocatable in a fluid filled cylinder and dividing same into two chambers; said plunger including a high-flow-rate path having a one-way valve permitting the fluid to flow therethrough at a high rate when the plunger is reciprocated by the pressurized fluid from its valve-open-position to its valve-closed-position; said plunger further including a low-flow-rate path permitting the fluid to flow therethrough at a low rate when the plunger is reciprocated by said return means from its valve-closed-position to its valve-open-position.

3. The valve according to claim 2, wherein said low-flow-rate path is defined by a spiral passageway through said plunger.

4. The valve according to claim 2, wherein said low-flow-rate path is defined by a labyrinth passageway through said plunger.

5. The valve according to claim 1, wherein said coupling means comprises a pivotable cam member having a first face engageable with the valve member to move same to its closed position, and a second face engageable with the valve member to permit same to move to its open position; and a snap-action toggle mechanism engageable with said intermediate portion of the stem for pivoting said cam member to cause its first face or its second face to engage the valve member.

6. The valve according to claim 1, wherein said return means comprises a return spring loaded during the forward strokes when the valve member is driven from its open position to its closed position.

7. The valve according to claim 1, wherein said return means comprises a second piston carried by said stem but of smaller cross-sectional area than said first-mentioned piston, and a fluid coupling from the inlet side of the valve to said second piston for causing same to drive the cyclically-operable timer through its return strokes.

* * * * *